United States Patent
Wittrock

(10) Patent No.: US 6,944,196 B2
(45) Date of Patent: Sep. 13, 2005

(54) SOLID STATE LASER AMPLIFIER

(75) Inventor: Ulrich Wittrock, Münster (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 138 days.

(21) Appl. No.: 10/356,337

(22) Filed: Jan. 31, 2003

(65) Prior Publication Data

US 2004/0076211 A1 Apr. 22, 2004

(30) Foreign Application Priority Data

Feb. 2, 2002 (DE) .......................................... 102 04 246

(51) Int. Cl.⁷ ............................................... H01S 3/04
(52) U.S. Cl. ............................................ 372/34; 372/36
(58) Field of Search .......................... 372/34–36, 68–70

(56) References Cited

U.S. PATENT DOCUMENTS

| | | | | |
|---|---|---|---|---|
| 3,631,362 A | * | 12/1971 | Almasi et al. ................. | 372/35 |
| 5,063,566 A | * | 11/1991 | Dixon .......................... | 372/22 |
| 5,091,915 A | * | 2/1992 | Tatsumi et al. ............... | 372/75 |
| 5,115,445 A | * | 5/1992 | Mooradian ................... | 372/75 |
| 5,131,002 A | * | 7/1992 | Mooradian ................... | 372/50 |
| 5,305,345 A | * | 4/1994 | Albrecht et al. ............. | 372/69 |
| 5,311,528 A | * | 5/1994 | Fujino ......................... | 372/35 |
| 5,315,612 A | * | 5/1994 | Alcock et al. ................ | 372/69 |
| 5,317,585 A | * | 5/1994 | Gregor ........................ | 372/35 |
| 5,386,427 A | * | 1/1995 | Zayhowski ................... | 372/34 |
| 5,796,766 A | * | 8/1998 | Hargis et al. ................. | 372/36 |
| 6,002,695 A | | 12/1999 | Alfrey et al. | |
| 6,101,201 A | * | 8/2000 | Hargis et al. ................. | 372/36 |
| 6,665,328 B1 | * | 12/2003 | Henrie et al. ................ | 372/69 |
| 6,667,999 B2 | * | 12/2003 | Hasson et al. ............... | 372/36 |
| 6,804,274 B2 | * | 10/2004 | Huonker et al. ............. | 372/34 |
| 6,810,060 B2 | * | 10/2004 | Vetrovec ..................... | 372/68 |
| 2002/0039377 A1 | * | 4/2002 | Zapata et al. ................ | 372/70 |
| 2002/0110166 A1 | * | 8/2002 | Filgas ......................... | 372/36 |
| 2003/0063638 A1 | * | 4/2003 | Hasson et al. ............... | 372/36 |

FOREIGN PATENT DOCUMENTS

| EP | 0 632 551 B1 | 1/1995 |
|---|---|---|
| EP | 0 632 551 A1 | 1/1995 |

OTHER PUBLICATIONS

Laser Focus World, Dec. 2001 Ed., p. 115–118.
Laser Focus World, May 1998 Ed., p. 32–35.
Laser Focus World, May 1994 Ed., p. 46–50.

* cited by examiner

*Primary Examiner*—Minsun Oh Harvey
*Assistant Examiner*—Phillip Nguyen
(74) *Attorney, Agent, or Firm*—Kenyon & Kenyon

(57) ABSTRACT

The present invention provides a non-laser-active solid which is connected to a laser-active solid which has a reflective layer system and is cooled by a cooling member. Parallel isothermal planes are created in laser-active solid which are passed through by laser beam at a shallow angle. In this manner, a compact laser beam amplifier system is created which functions without a costly beam shaping optical system for semiconductor laser, and has a good beam quality even at high power.

10 Claims, 2 Drawing Sheets

SOLID STATE LASER AMPLIFIER

FIELD OF THE INVENTION

The present invention relates to a solid state laser and a solid state laser amplifier used, for example, in materials processing, medicine, telecommunications and optical measurement technology.

BACKGROUND INFORMATION

A plurality of different systems concepts are known for solid state lasers and solid state fiber amplifiers. The book by Walter Koechner, *Solid State Laser Engineering*, Springer Verlag (Publishers), 5th edition, 1999, gives a good overview. Originally, the active element of a solid state laser had a cylindrical rod shape, and the optical excitation energy was generated using strong gas discharge lamps. However, semiconductor lasers are predominantly being used currently for the optical excitation of solid state lasers. In using excitation by semiconductor lasers, a substantially higher efficiency may be achieved in the conversion of electrical input power into laser power. Even in the excitation of solid state lasers using gas discharge lamps, other geometric shapes were known besides the cylindrical rod shapes of the laser-active solid, such as the round slab laser or the rectangular slab laser. However, excitation using semiconductor lasers has led to a whole series of new geometric shapes of the solid state laser-active materials used, and to new systems concepts, such as the disk laser (discussed, for example, in European Patent 0 632 551), the microchip laser, the non-planar monolithic ring laser or the "grazing incidence slab laser" (discussed, for example, in U.S. Pat. No. 6,002,695 and U.S. Pat. No. 5,315,612).

One common aim of almost all systems concepts for solid state lasers or solid state laser amplifiers is to achieve highest possible beam quality of the generated or amplified laser radiation. The beam quality of a laser, which may be equated to its focusability, is a decisive quality criterion concerning lasers. However, in addition to the aim of achieving the highest possible beam quality, other aims are striven for, such as high efficiency and a simple and compact design.

However, all the known concepts have certain disadvantages. Even in the case of excitation using semiconductor lasers, the traditional rod laser has a thermal lens and photoelastic birefringence, which leads to a bad beam quality at higher laser power.

on the other hand, if the design is appropriate, a slab laser having a zigzag optical path has only one very slight thermal lens and hardly any stress birefringence. However, for this it is presupposed that the crystal of the slab laser has a large aspect ratio. The aspect ratio is the quotient of the great crystal dimension transverse to the laser beam ("height") and the small crystal dimension transverse to the laser beam ("thickness"). A large aspect ratio of the crystal dimensions as a result has a great height of the laser crystal, because the crystal cannot be made as thin as desired, since otherwise its mechanical rigidity would suffer. However, a great crystal height leads to an oscillation buildup of high transverse modes, which leads to poor beam quality. In the past there were many experiments on the subject of achieving good beam quality by the use of special optical resonators (e.g. unstable optical resonators or folded optical resonators). However, in practice none of these methods was able to succeed, since all are very sensitive to the least bit of interference of the laser beam. A further disadvantage of the conventional slab lasers is that the slantwise passage of the laser beam through the crystal's end faces gives rise to astigmatism. Finally, all the known slab lasers have aberrations which are brought on by deformation of the crystal's surface. In the case of most slab lasers, the crystal is pumped homogeneously over the two totally reflecting surfaces, so that these surfaces are not able to be cooled any more by solid state contact cooling. The totally reflecting surfaces are therefore cooled using a liquid (usually water), which is transparent to the pumping light. However, in a laser system a liquid always represents a risk factor since, in the case of leakage, great damage may be created to the optics and the pumping light source. A further disadvantage is that the tips of the slab crystal are deformed by thermomechanical stress. If only one of the two totally reflecting surfaces of the slab crystal is pumped, the other crystal surface may be used for contact cooling of the solid. Though, when it comes to this design, a variation of the pumping power leads to a deflection of the laser beam. The reason for this is the asymmetrical, changing deformation of the crystal surfaces at which the laser beam is totally reflected. This effect, known as "beam steering", in the amplifier operation leads to an undesired change of direction of the laser beam, and in the laser oscillator operation it leads to the optical resonator's going out of alignment and to the decline of the output power. In the history of solid state lasers, a great many firms have occupied themselves with the development of slab lasers, but almost all of them have given up the corresponding purposes, since the problems turned out to be insolvable.

The disk laser combines some of the advantages of the rod laser and the slab laser. The transverse dimensions of the crystal are small, similar to the rod laser. Since the beam runs perpendicular to the isotherms in the crystal, practically no thermal lens appears, just as in the slab laser. The beam quality is good if the pumping light is focused on a small, round spot in the disk, since then there is no buildup of higher transverse modes. In order to achieve a sufficiently high power using the small pumped area, the disk must be made very thin, because only in that manner can the thermomechanical stresses be held low. However, a thin disk absorbs only a part of the pumping light, so that the pumping light has to traverse the disk several times if there is to be a sufficient absorption overall. The strong focusing of the pumping light on one round spot requires great expenditure, because semiconductor lasers themselves have a rectangular aperture having an extremely large aspect ratio. Therefore, anamorphotic optics are required to generate a round beam. The multiple traversals of the pumping light through the crystal require additional optical systems which increase the expenditure once again. These two optical systems lead to a large overall type of construction of the laser, as well as resulting in high costs and limited reliability.

Even the monolithic ring laser requires a round pumping light beam, and it thus has the same disadvantages as the disk laser with respect to pumping light formation. In one known system, at any rate, as in the case of the disk laser, the thermal lens is avoided (discussed, for example, in published German Patent Application No. 197 22 943.3).

The grazing incidence slab laser cannot, in the actual sense of the term, be denoted as a slab laser, since it has a considerable thermal lens. To be sure, as in the usual slab laser, the thermal lens is compensated for in the direction perpendicular to the reflecting surface; however, in the direction orthogonal to that, a strong thermal lens effect appears. The reason is that, in this direction, a constant temperature is not present in the laser crystal. The light of a semiconductor laser ingot is focused into the laser crystal using a cylindrical lens, or is conducted into the crystal by direct coupling. In this context, the pumping light enters the crystal through that particular crystal surface at which the laser beam of the solid state laser is also reflected. Since this crystal surface is needed for the coupling in of the pumping light, it is not able to be simultaneously used as the cooling surface for contact cooling. Therefore, the crystal is cooled at the two large surfaces perpendicular to this surface. However, this leads to a temperature gradient transverse to the laser beam, and thus to a thermal cylindrical lens.

It may be said in general that, at this time, there are two kinds of solid state lasers pumped by semiconductor lasers. On the one hand, lasers exist in which the geometry of the active medium is rectangular and is thus adapted to the geometry of the semiconductor laser ingot. These are the slab lasers, which, however, have strong aberrations and a bad beam quality. On the other hand, lasers exist in which the pumped volume of the active medium is adapted to the round shape of the $TEM_{00}$ mode. These lasers (longitudinally pumped rod lasers, disk lasers, monolithic ring lasers), however, require a costly beam formation of the pumping light of the semiconductor laser, in order to transform the rectangular beam cross section of the light that leaves the semiconductor laser, into a round beam cross section of the cylindrical region of the active medium that may be pumped. These beam transforming optical systems are very costly and lead to power loss, as discussed, for example, in the journal *Laser Focus World*, (Laser Focus World, 98 Spit Brook Road, Nashua N.H. 03082, USA), December 2001 Edition, page 115 ff, *Laser Focus World*, May 1998 Edition, page 32 ff, as well as *Laser Focus World*, May 1994 Edition, page 46 ff.

The object of the present invention is to provide a solid state laser or a solid state laser amplifier which does not have the above-described disadvantages of the known systems. It should not have a thermal lens nor stress-induced birefringence, it should supply a diffraction-limited laser beam, but should nevertheless make do without anamorphotic beam formation for the pumping light of the semiconductor laser, i.e. the systems concept should be adapted both to the round $TEM_{00}$ mode and to the rectangular beam profile of the semiconductor lasers. In addition, the laser should be constructed simply and cost-effectively, the laser-active solid and the other optical components should have no astigmatism and no "beam steering" for the laser beam, the laser should have a high efficiency and be cooled by solid state contact cooling.

SUMMARY

The present invention provides a non-laser-active solid which is connected to a laser-active solid which has a reflective layer system and is cooled by a cooling member. Parallel isothermal planes are created in laser-active solid which are passed through by laser beam at a shallow angle. In this manner, a compact laser beam amplifier system is created which functions without a costly beam shaping optical system for semiconductor laser, and which has a good beam quality even at high power.

DETAILED DESCRIPTION

Figure 1:
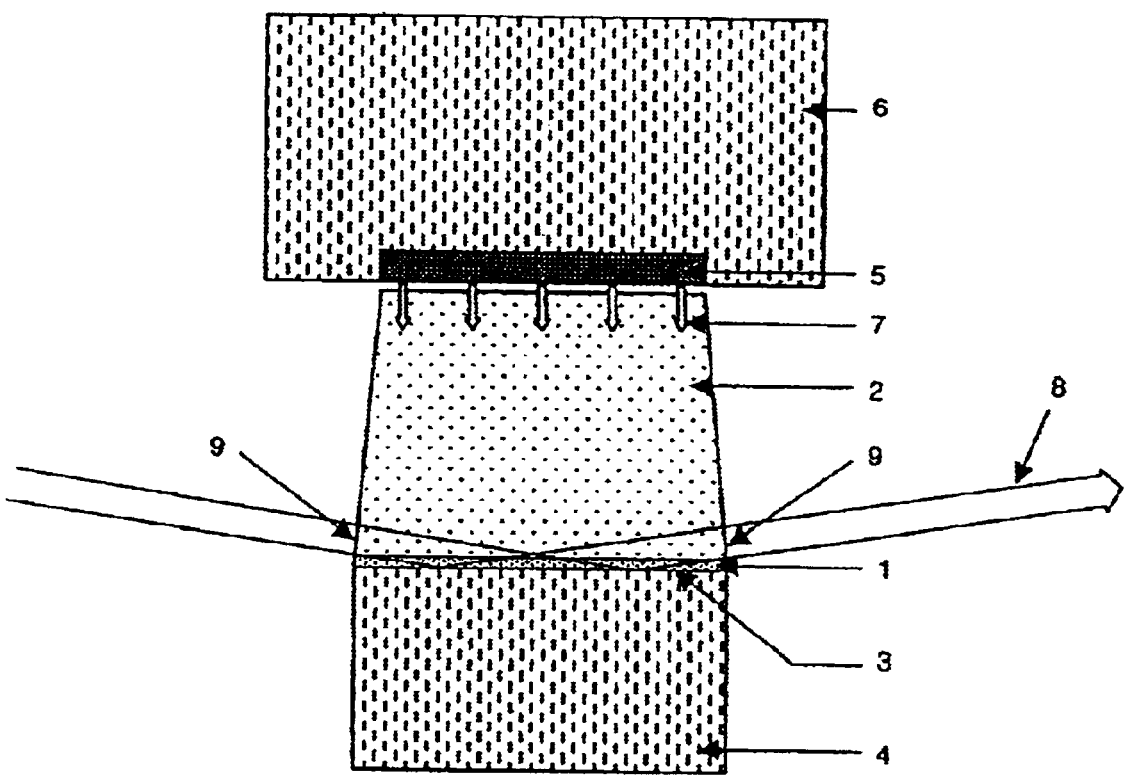
FIG. 1 shows a side view of an exemplary embodiment of the present invention.
Figure 2:
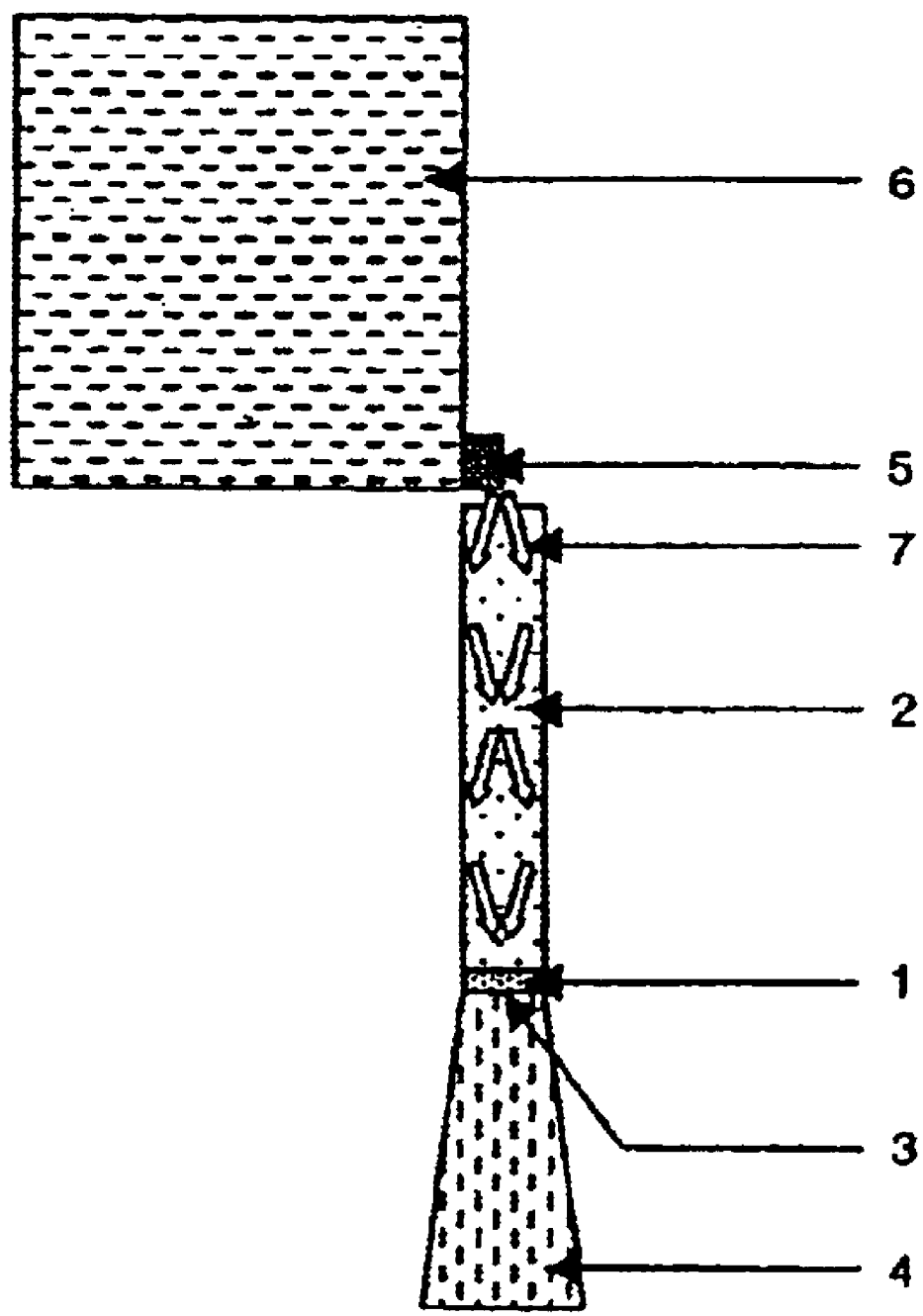
FIG. 2 shows a second side view of the embodiment shown in FIG. 1, the second side view being perpendicular to the side view of FIG. 1.

FIG. 1 shows an exemplary embodiment of the present invention in a side view, and FIG. 2 shows the same exemplary embodiment in a side view perpendicular to it. Laser-active solid (1) in this exemplary embodiment is an yttrium orthovanadate crystal doped with the laser-active substance neodymium. This laser-active solid (1) has dimensions of 12 mm×1.5 mm×0.3 mm, for example. It is fixedly connected to non-laser-active solid (2), which may be a pure yttrium orthovanadate crystal without neodymium doping. This crystal which is trapeze-shaped in side view (FIG. 2) has a base area of 12 mm×1.5 mm, for example, and, parallel to it, a top surface of 10.5 mm×1.5 mm at a height of 8.5 mm, for example. A suitable procedure for firmly connecting the laser-active solid (1) and the non-laser-active solid (2) to each other is the process of diffusion bonding. In this process, both crystals are polished flat at the surfaces to be connected, pressed against each other and heated close to their melting point. In this context, the crystals connect to each other in an undetachable manner. The method is offered commercially by the firm Onyx Optics at Fremont Calif., USA. Other methods may also be utilized, such as suitable adhesive methods or melting methods for connecting a laser glass to a glass that is not laser-active.

Laser-active solid (1) is provided with a layer system (3) made of one or more layers, for reflecting laser beam (8) that is to be generated or amplified. Layer system (3), for example, may have a dielectric layer of magnesium fluoride on its side facing laser-active solid (1), which has a relatively low refractive index, so that the laser beam experiences total reflection at the boundary surface between laser-active solid (1) and the magnesium fluoride layer, given a sufficiently great angle of incidence (measured from the normal to the surface).

Laser-active solid (1) is now fastened with its layer system (3) to a cooling member (4) which is used for removing the heat due to energy losses from laser-active solid (1). This fastening may be accomplished, for example, by pressing it onto cooling member (4), using an interposed, thin foil of indium, or by a heat-conducting adhesive. Cooling member (4) may, for instance, be made of copper, and may itself, in turn, be cooled by a thermoelectric cooling element.

A pumping light source (5), which is fastened on a cooling member (6), supplies pumping light (7) for the optical excitation of the laser-active atoms in laser-active solid (1). Pumping light source (5) may be a semiconductor which emits at a wavelength of 808 nm or 880 nm. Designs that are approximately 1 cm long are usual, having many individual emitters which are known as high-speed diode laser ingots. In the case of the exemplary embodiment, one might use a laser ingot having a continuous wave output power of 30 watt. Non-laser-active solid (2) is expediently polished on all sides, so that it guides pumping light (7) by total reflection at its side surfaces. Layer system (3) is expediently designed in such a way that it also highly reflects pumping light (7), so that the part of pumping light (7) not absorbed in laser-active solid (1) during the first passage, after reflection at layer system (3), makes a second passage through laser-active solid (1).

A substantial advantage of the present invention is that the systems concept is adapted both to the rectangular geometry of the semiconductor laser ingots and to the round beam cross section of a diffraction-limited $TEM_{00}$ laser mode. The greatly elongated surface of the laser-active solid advantageously adapts to the long dimension of semiconductor laser ingots that are common in the field. That is why the pumping light of one or more semiconductor laser ingots is coupled into the laser-active solid without additional beam formation.

The TEM$_{00}$ laser mode has the best possible beam quality. In order to be able to generate such a laser mode in a laser system, using a simple and reliable laser resonant cavity, the cross sectional area of the laser beam has to be circular and as small as possible. Without additional apertures, the laser beam having the greatest possible cross sectional area is established in a resonant cavity. By suitably selecting the angle between laser beam (8) and layer system (3) one may achieve a laser beam having a square cross section. The calculation of this angle, using the methods of trigonometry, is simple, but leads to a transcendental equation which is not able to be solved analytically but only numerically. For the range of small angles, which are the ones mainly of interest for the present invention, the equation may, however, be approximated in that the angular functions sine and tangent are replaced by their arguments. In this case, for the angle alpha, one obtains:

$$\alpha = 2\frac{h}{l} + \frac{b}{l},$$

where $\alpha$ is the angle between laser beam (8) and the plane of layer system (3), h is the height of the laser-active solid, b is its width and l is its length. So, in the exemplary embodiment of FIG. 1 and FIG. 2, as was explained above, h=0.3 mm, b=1.5 mm and l=12 mm, so this yields an angle $\alpha$=0.175=10°. A square beam cross section is the nearest approximation to the round beam cross section of the TEM$_{00}$ mode. By inserting a circular aperture into the resonant cavity, whose diameter is about the same size as width b of the laser-active solid, and by selecting suitable radii of curvature and separation distances of the cavity mirrors, a TEM$_{00}$ mode may be forced which almost completely fills the laser-active medium. Thus, the pumping light absorbed in the laser-active solid is converted into laser light at high efficiency. One factor determining this efficiency is the so-called filling factor, that is, the area ratio of laser beam cross section area to the free laser beam aperture of the laser-active solid. In the case of the optimum angle calculated, the filling factor is:

$$\pi(b/2)^2/b^2 = \pi/4 = 0.79.$$

This number means that, in the adjustment of the rectangular pumping light beam to the round TEM$_{00}$ laser mode only 21% losses occur. This high value of the filling factor is a decisive condition for the high efficiency of the conversion of pumping light power into laser light power. In this context, one should consider that, in the case of the laser amplifier system according to the present invention, no loss-afflicted beam formation of pumping light, by microoptical systems or the like, is necessary.

Also of advantage is the large cooled surface of the laser-active solid which, in connection with its slight thickness, permits efficient cooling, and thus a high output power. In this context, it is important that, in contradistinction to the disk laser, the cooled surface is substantially larger than the laser beam cross sectional area, so that the high output power may be achieved at the same time as good beam quality. In accordance with the present invention, this is achieved by the small angle of laser beam (8) relative to the cooled surface, i.e. relative to layer system (3).

A further advantage of the present invention is that the laser beam is not negatively influenced by temperature gradients in the laser-active solid, even at high pumping power. The reason is that, according to the present invention, a homogeneous temperature increase of the laser-active solid is achieved by the pumping light in all planes parallel to the cooled surface. If, in addition, then, the cooled surface is uniformly cooled, a temperature field is created in the crystal which has isothermal planes which run parallel to the cooled surface. The laser beam passes through this temperature field at a shallow angle to the isothermal planes, i.e. at a large angle (greater than 45°, typically about 60° to 89°) relative to the temperature gradient, which is positioned perpendicular to the isothermal planes. The laser beam is reflected at the highly reflective layer system and passes through the temperature field for a second time before leaving the laser-active solid. If one imagines the laser beam as a bundle of parallel, thin component beams, then each component beam passes through the same temperature differences, at a slight time delay. The optical path, which, because of the temperature dependence of the refractive index, is generally a function of the temperature, is therefore equally long for all component beams on the way through the laser-active solid, and there is no influence of the temperature field on the phase surface of the laser beam. Consequently, there are also no harmful thermal refractive effect or harmful thermooptical aberrations.

In non-laser-active solid (2) there are no heat sources. This member is thermally insulated at all outer surfaces by the surrounding air (or vacuum), except for the connecting surface to laser-active solid (1). This connecting surface is, however, an isothermal plane, as explained in the previous paragraph. Therefore, in the non-laser-active solid there are no temperature gradients and therefore there is also no thermal refractive effect and no thermooptic aberration.

The parallel isothermal planes additionally lead to an almost even strain in the laser-active solid and in the non-laser-active solid. Such a strain causes no depolarization of the laser beam. This is a great advantage over rod lasers.

In the operation as laser amplifier, the slantwise incidence of the laser beam on the laser-active solid offers the advantage that the laser beam covers a long path in the laser-active solid, and thereby experiences a high amplification. That is why only some or a few passages of the laser beam through the laser-active solid are necessary in order to amplify the laser beam up to a point beyond the saturation intensity, which is necessary for the high efficiency of a laser amplifier. This considerably lowers the construction costs connected with multiple passages of the laser beam through the laser-active solid.

The first layer of the layer system on the laser-active solid is designed as a layer having a relatively small refractive index, so that the laser beam experiences total reflection at this layer. In this way no reflection losses are created for the laser beam, in contrast to other laser concepts having large angles of incidence and multiple layer systems.

A further advantage of the small angle of incidence and the total reflection is that only one layer is necessary, which leads to a decreased thermal resistance. In general, dielectric layers have a low specific heat conductivity, and the smaller the number and the thickness of the layers of the layer system, the less the overall thermal resistance of the layer system. A low thermal resistance makes possible effective cooling, and thus high laser performance.

In the exemplary embodiment, non-laser-active solid (2) has slightly trapezoidal side surfaces, so that laser beam (8), both at entry and at emergence into or from the non-laser-active solid, respectively, pierces its surfaces perpendicularly. As a result, no interfering astigmatism is created, in contrast to the known rod lasers.

Surfaces (9), at which the laser beam enters into or emerges from the non-laser-active solid, are provided with an antireflection coating, in order to avoid reflection losses of the laser beam. If $YVO_4$ is used as the material for the non-laser-active solid, even using an $\lambda/4$ single layer will achieve a degree of reflection of clearly less than 0.1% for the ordinary beam.

Even the surface at which pumping light (7) first enters non-laser-active solid (2) is expediently provided with an anti-reflection layer.

The non-laser-active solid is configured so that the pumping light is guided at its walls through total reflection. The known formulas for total reflection and refraction of light establish that the total reflection is fulfilled, independent of the angle at which the pumping light is emitted from the semiconductor laser, as long as the index of refraction of the non-laser-active solid is greater than about 1.4. It is seen from FIG. 2 how the multiple total reflection of pumping light (7) leads to a homogenization of pumping light distribution in laser-active solid (1). A homogeneous pumping light distribution is important so that parallel isothermal planes are present in the laser-active solid, and no thermal lens is created.

In this context, no optical system is necessary for coupling in the pumping light, in particular, no cylindrical lens is required for collimating the pumping light in the direction of the large angle of divergence. This saves considerable expenditures.

By connecting thin, laser-active solid (1) with the substantially thicker non-laser-active solid (2), a high mechanical rigidity of the overall system is achieved. This provides an advantage, since a large, thin laser-active solid would otherwise break easily while being mounted, or would deform while in operation. Deformation would result in "beam steering" or aberrations, which are harmful to the laser beam.

What is claimed is:

1. A solid-state laser amplifier system, comprising:
    at least one laser-active solid;
    at least one non-laser-active solid;
    a pumping light source positioned adjacent to the at least one non-laser-active solid;
    a cooling device; and
    a layer system;
        wherein the laser-active solid is slab-shaped and is fixedly connected at first surface to the non-laser-active solid and coupled at a second surface to the layer system, wherein a laser beam to be one of generated and amplified is reflected at the layer system, and wherein a major portion of a heat generated in the laser-active solid is removed by the cooling device to cool the second surface of the laser-active solid coupled to the layer system, so that isothermal planes are created in the laser-active solid, the isothermal planes extending approximately parallel to the cooled surface, and wherein the laser beam to be one of generated and amplified strikes the layer system at a shallow angle, and the laser beam to be one of generated and amplified passes through the non-laser-active solid before and after it passes through the laser-active solid.

2. The solid-state laser amplifier system as recited in claim 1, wherein the laser-active solid is shaped substantially as a rectangular parallelepiped.

3. The solid-state laser amplifier system as recited in claim 1, wherein the non-laser-active solid is positioned between the laser-active solid and the pumping light source, whereby a pumping light from the pumping light source is first coupled into the non-laser-active solid before reaching the laser-active solid.

4. The solid-state laser amplifier system as recited in claim 1, wherein a pumping light from the pumping light source is guided in the non-laser-active solid by total reflection at side surfaces of the non-laser-active solid.

5. The solid-state laser amplifier system as recited in claim 1, wherein a pumping light from the pumping light source is guided in the non-laser-active solid by reflection coated surfaces.

6. The solid-state laser amplifier system as recited in claim 1, wherein the pumping light source is at least one semiconductor laser ingot.

7. The solid-state laser amplifier system as recited in claim 1, wherein the pumping light source is a system of individual laser diodes.

8. The solid-state laser amplifier system as recited in claim 1, wherein the layer system coupled to the second surface of the laser-active solid reflects the pumping light.

9. The solid-state laser amplifier system as recited in claim 1, wherein a pumping light from the pumping light source passes through the laser-active solid a plurality of times.

10. The solid-state laser amplifier system as recited in claim 1, wherein the laser beam passes through the surface of the non-laser-active solid substantially perpendicularly so that no astigmatism is created.

* * * * *